(12) United States Patent
Kuriyama et al.

(10) Patent No.: US 7,930,320 B2
(45) Date of Patent: Apr. 19, 2011

(54) APPARATUS, METHOD, AND PROGRAM FOR VISUALIZING BOOLEAN EXPRESSIONS

(75) Inventors: Kinya Kuriyama, Chiba (JP); Mariko Nagai, Machida (JP); Daisuke Takuma, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/871,855

(22) Filed: Oct. 12, 2007

(65) Prior Publication Data

US 2008/0104088 A1 May 1, 2008

(30) Foreign Application Priority Data

Oct. 13, 2006 (JP) .................................. 2006-280612

(51) Int. Cl.
*G06F 7/00* (2006.01)
*G06F 17/30* (2006.01)
(52) U.S. Cl. ........................................ 707/803; 707/809
(58) Field of Classification Search .................. None
See application file for complete search history.

(56) References Cited

U.S. PATENT DOCUMENTS

| | | | |
|---|---|---|---|
| 5,592,663 A | 1/1997 | Nagamori | |
| 5,644,736 A * | 7/1997 | Healy et al. | 715/784 |
| 5,794,006 A * | 8/1998 | Sanderman | 709/223 |
| 5,809,212 A * | 9/1998 | Shasha | 706/46 |
| 6,304,260 B1 | 10/2001 | Wills | |
| 6,675,157 B1 * | 1/2004 | Mitchell | 1/1 |
| 6,910,031 B2 | 6/2005 | Ohtomo | |
| 2005/0125781 A1 * | 6/2005 | Swamy et al. | 717/144 |
| 2006/0156314 A1 * | 7/2006 | Waldorf | 719/328 |
| 2006/0224959 A1 * | 10/2006 | McGuire et al. | 715/700 |
| 2008/0010328 A1 * | 1/2008 | Moeller et al. | 708/200 |

OTHER PUBLICATIONS

F. Lohmueller, "CSG Constructive Solid Geometry", www.f-lohmueller.de/pov_tut/csg/pvocsg1e.htm (2003).

* cited by examiner

*Primary Examiner* — Cam Y T Truong
(74) *Attorney, Agent, or Firm* — William Stack; Anne Vachon Dougherty

(57) ABSTRACT

An apparatus, a method, and a program for visualizing a Boolean expression so that it is readily recognized what is added to or excluded from conditions. A Boolean expression to be visualized is input in the form of a binary tree in which a leaf node represents an operand in the Boolean expression and a node other than the leaf node represents an operator in the Boolean expression. The input binary tree is transformed into a two-dimensional nested representation composed of a plurality of regions, and a pictorial representation for visualization is drawn on the basis of the nested representation and is displayed. When the Boolean expression is provided in a string expression, the string expression is transformed into a binary tree.

14 Claims, 14 Drawing Sheets

FIG. 4

| ID | TYPE | LEFT CHILD NODE | RIGHT CHILD NODE | NOT FLAG | LABEL |
|---|---|---|---|---|---|
| 0 | AND | 1 | 2 | FALSE | NULL |
| 1 | LEAF | NULL | NULL | FALSE | A |
| 2 | OR | 3 | 6 | TRUE | NULL |
| 3 | AND | 4 | 7 | FALSE | NULL |
| 4 | AND | 5 | 8 | FALSE | NULL |
| 5 | LEAF | NULL | NULL | FALSE | B |
| 6 | LEAF | NULL | NULL | FALSE | E |
| 7 | LEAF | NULL | NULL | TRUE | D |
| 8 | LEAF | NULL | NULL | FALSE | C |

| ID | FLAG | LABEL | ROOT NODE FLAG |
|----|-------|-------|----------------|
| 1  | TRUE  | A     | FALSE          |
| 5  | TRUE  | B     | FALSE          |
| 6  | TRUE  | E     | FALSE          |
| 7  | FALSE | D     | TRUE           |
| 8  | TRUE  | C     | FALSE          |

FIG. 11
ALL-ELEMENT
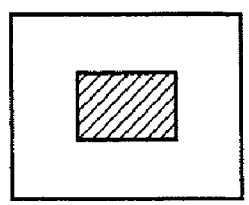
FIRST TYPE
ALL-ELEMENT
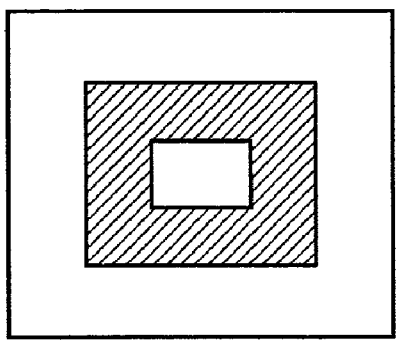
SECOND TYPE
ALL-ELEMENT
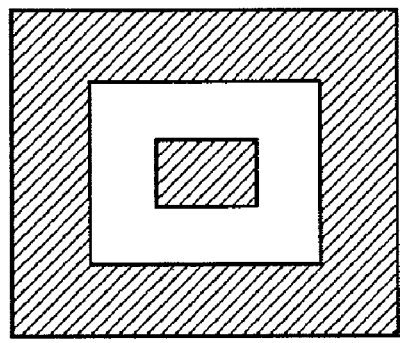
THIRD TYPE

| NODE | LABEL | FLAG | POINTER | CHILD NODE |
|---|---|---|---|---|
| 1 | ALL-ELEMENT | FALSE | NULL | 2 |
| 2 | B | FALSE | NULL | 3 |
| 3 | C | TRUE | NULL | NULL |

(2)

| NODE | LABEL | FLAG | POINTER | CHILD NODE |
|---|---|---|---|---|
| 1 | ALL-ELEMENT | FALSE | NULL | 2 |
| 2 | B | FALSE | NULL | 3 |
| 3 | C | TRUE | NULL | 4 |
| 4 | D | FALSE | NULL | NULL |

(3)

| NODE | LABEL | FLAG | POINTER | CHILD NODE |
|---|---|---|---|---|
| 1 | ALL-ELEMENT | FALSE | NULL | 2 , 5 |
| 2 | B | FALSE | NULL | 3 |
| 3 | C | TRUE | NULL | 4 |
| 4 | D | FALSE | NULL | NULL |
| 5 | E | TRUE | NULL | NULL |

(5)

| NODE | LABEL | FLAG | POINTER | CHILD NODE |
|---|---|---|---|---|
| 1 | ALL-ELEMENT | FALSE | NULL | 2 |
| 2 | A | TRUE | NULL | 3 , 6 |
| 3 | B | TRUE | NULL | 4 |
| 4 | C | FALSE | NULL | 5 |
| 5 | D | TRUE | NULL | NULL |
| 6 | E | TRUE  FALSE | NULL | NULL |

APPARATUS, METHOD, AND PROGRAM FOR VISUALIZING BOOLEAN EXPRESSIONS

TECHNICAL FIELD

The present invention relates to an apparatus, a method, and a program for visualizing Boolean expressions. In particular, the present invention relates to an apparatus, a method, and a program for visualizing an arbitrary Boolean expression representing a search condition, a set operation, or the like, allowing a person to readily recognize "what is added to or excluded from conditions".

BACKGROUND ART

A Boolean expression used in a search tool or a set operation is generally expressed in a string expression, tree form, reverse Polish notation, or Venn diagram. For example, a Boolean expression is written as a string expression such as (A AND (NOT ((B AND C AND (NOT D)) OR E))). In this expression, A to E are operands and AND, OR, and NOT are operators of the Boolean expression. In a search expression, each key word serves as an operand. The above string expression can be transformed into a tree form, as illustrated in FIG. 1. FIG. 1(A) illustrates a normal tree, and FIG. 1(B) illustrates a binary tree. In the reverse Polish notation, an operator is placed after its operands, and the above string expression is expressed as "A B C AND D NOT AND E OR NOT AND". The above string expression is also expressed as illustrated in FIG. 2, for example, using a Venn diagram which uses closed curves corresponding to operands to divide a region into $2^N$ (N is the number of operands).

None of the above expression schemes can convey the meaning of the expressions to users without any specialized knowledge. Thus, techniques have been developed for presenting a Boolean expression in a manner that facilitates understanding of the Boolean expression as much as possible. For example, U.S. Pat. No. 5,592,663 discloses a graphic user interface which allows presentation of the quantity of sets in database retrieval and logical relations between the sets in a graph, calculation and manipulation of the sets by specifying rectangular regions in the graph, and extraction of data. In addition, U.S. Pat. No. 6,910,031 discloses a user interface which allows presentation of results of data search in a data search system in a human-recognizable format. In both the above techniques, visualization is performed so that the area of each bounded region represents the number of elements of corresponding subsets. However, this visualization is based on a Venn diagram, indicating that an increase in the number of sets increases complexity, and thus it is not possible to promptly convey information as to what is added to or excluded from conditions.

In the field of CAD, a set operations called "CSG (Constructive Solid Geometry)" is known, as described, for example, by F. Lohmueller on the web page found at f-lohmueller.de/pov_tut/csg/povcsg1e.htm. In this set operation, diagrams (subsets) in a three dimensional space serve as operands, and Boolean operations such as "union", "merge", "intersection", and "difference" are defined, which allows drawing of complex diagrams. However, similarly to the case of the Venn diagram, it cannot be clearly seen from diagrams obtained through this technique which points are added or deleted.

SUMMARY OF THE INVENTION

Accordingly, the object of the present invention is to provide an apparatus, a method, and a program for visualizing a Boolean expression so that it can easily be seen what is added to or excluded from conditions.

A conventional visualization technique utilizes partial overlapping of sets, which lowers visibility, as illustrated in FIG. 2, for example. However, according to the present invention, such partial overlapping is removed by employing a two-dimensional nested representation such that it can easily be seen what is added to or excluded from conditions. Needless to say, such a nested representation does not degrade the accuracy of a Boolean expression. According to the present invention, a Boolean expression to be visualized is input in the form of a binary tree in which a leaf node represents an operand in the Boolean expression and a node other than the leaf node represents an operator in the Boolean expression. The input binary tree is transformed into a two-dimensional nested representation composed of a plurality of regions. On the basis of the nested representation, a pictorial representation for visualization is drawn and displayed. The Boolean expression may be provided in a string expression. In this case, the string expression is transformed into a binary tree. The present invention provides an apparatus, a method, and a program for such a visualization scheme.

BRIEF DESCRIPTION OF THE DRAWINGS

FIG. 4 is a diagram illustrating a data structure of a binary tree illustrated in FIG. 1(B).

FIG. 11 is a diagram illustrating an example of three types of operand for an AND operation.

FIG. 16 is a diagram illustrating a data structure of the nested objects illustrated in FIG. 15.

BEST MODE FOR CARRYING OUT THE INVENTION

Figure 3:
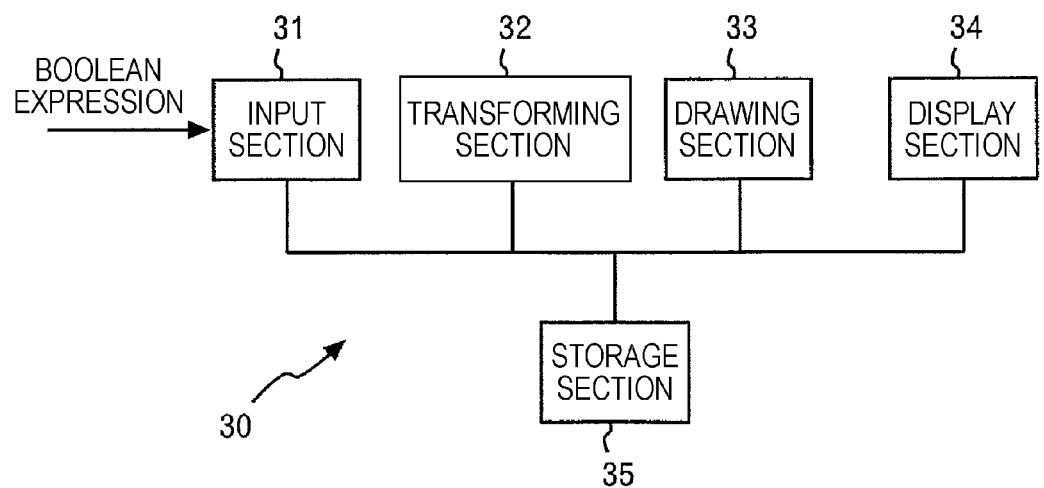
FIG. 3 is a block diagram illustrating a configuration of a Boolean expression visualizing apparatus according to the present invention.

FIG. 3 illustrates a Boolean expression visualizing apparatus according to an embodiment of the present invention. A Boolean expression visualizing apparatus 30 in FIG. 3 includes an input section 31 that inputs a Boolean expression to be visualized in the form of a binary tree in which a leaf node represents an operand in the Boolean expression and a node other than the leaf node represents an operator in the Boolean expression, a transforming section 32 that transforms the binary tree into a two-dimensional nested representation composed of a plurality of regions, a drawing section 33 that draws a pictorial representation for visualization on the basis of the nested representation, a display section 34 that displays the drawn pictorial representation, and a storage section 35 that is accessed by these functional components, and stores the binary tree input by the input section 31, the nested representation created by the transforming section 32, and the pictorial representation drawn by the drawing section 33. In the following, an embodiment in which the present invention is applied to a search tool such as text mining will be described. However, the present invention is not limited to being applied to search expressions used in search tools and is also applicable to arbitrary Boolean expressions.

Figure 1:
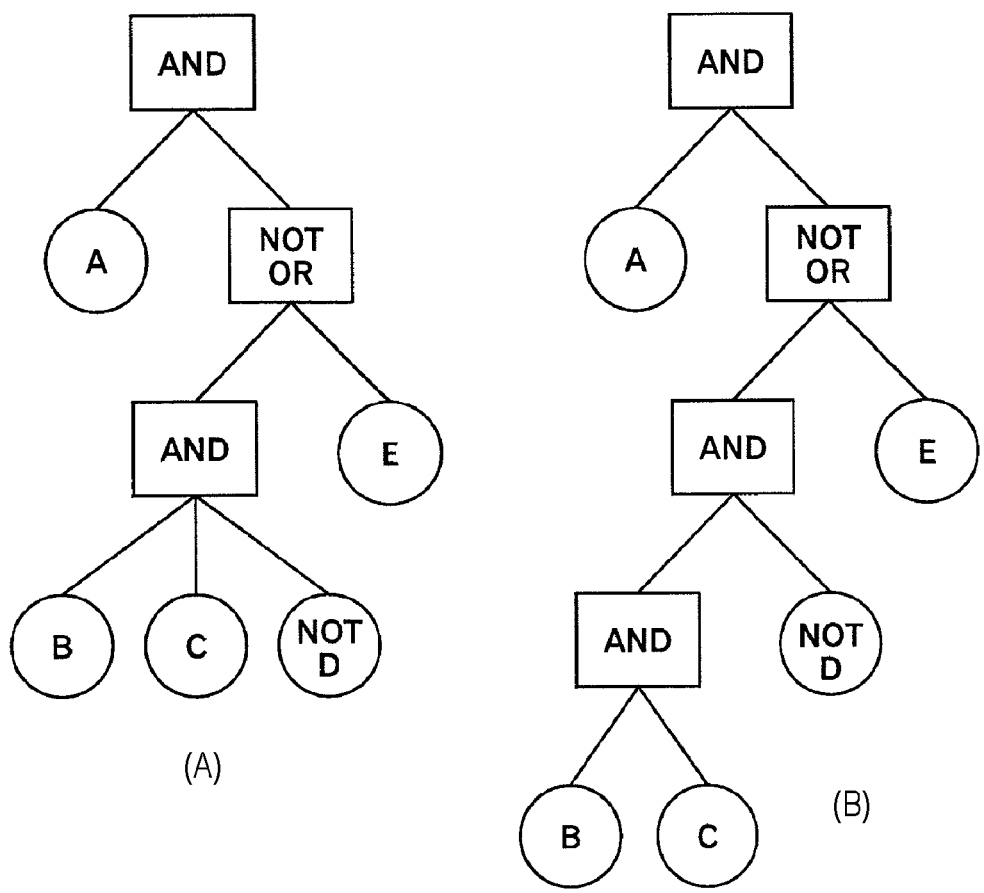
FIG. 1 is a diagram illustrating an example of a tree structure representation of a Boolean expression.
Figure 2:
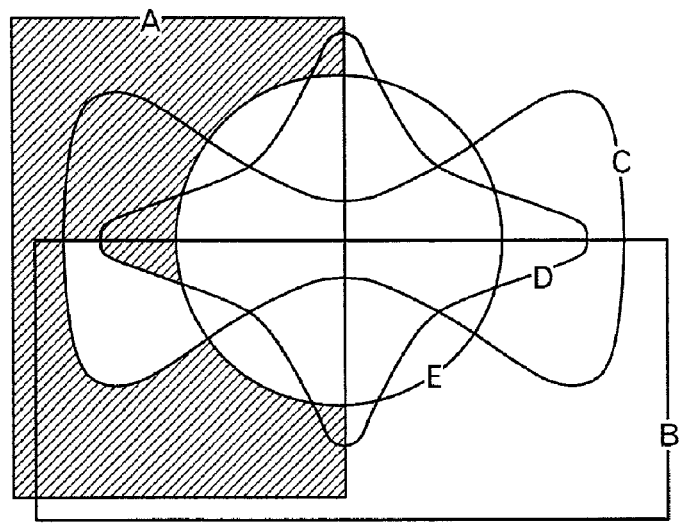
FIG. 2 is a diagram illustrating a Venn diagram representation of a Boolean expression.

The input section 31 transforms a Boolean expression of a character string provided from a search tool (not shown) into a binary tree as illustrated in FIG. 1(B) and stores the binary tree in the storage section 35. For example, in text mining, a string expression with parentheses such as (A AND (!((B AND C AND (!D)) OR E))) is automatically created. The symbol "!" represents a NOT operation. In the present embodiment, visualization is performed on the basis of such a string expression with parentheses. In a string expression with parentheses, for example, an AND operation is denoted as (A AND B AND C), an OR operation is denoted as (A OR B OR C), and a NOT operation is denoted as (!A). Each of the operands for these operations, such as A, B, and C may itself be another string expression. In addition, since ease of understanding is given the highest priority in visualization of Boolean expressions, it is preferred that operators to be used are limited to AND, OR, and NOT. If a given string expression includes an operator other than the above, such as NAND and NOR, the string expression is converted into an equivalent string expression containing only AND, OR, and NOT. This conversion is well known in the art, and thus the details thereof will be omitted.

The input section 31 transforms the above string expression with parentheses into a binary tree by sequentially processing the string expression from the outermost parentheses. Such transformation from a string expression to a binary tree is known and will briefly be described. A tree is created by deleting all parentheses other than the outermost parentheses together with their contents and storing the deleted parentheses and their contents as a different operand. In the above example, (A AND F) is processed first and a tree in which AND serves as a root node, and A and F serve as child nodes is created, in which F=(!((B AND C AND (!D)) OR E)). Next, the operand F is similarly processed. Since "!" is placed immediately after a parenthesis in this example, a NOT flag of a child node corresponding to the operand F is turned on, and an operand G=((B AND C AND (!D)) OR E), which is placed after "!", is processed. This represents an OR operation between an operand H=(B AND C AND (!D)) and the operand E. Thus, the input section 31 outputs a tree in which a child node corresponding to the operand F is set as an OR node and the operand H and the operand E are set as child nodes of the OR node. Subsequently, the operand H is similarly processed, and a normal tree as illustrated in FIG. 1(A) is eventually created.

In order to transform the normal tree into a binary tree, the input section 31 checks whether or not there is a node that has three or more child nodes, among AND nodes and OR nodes contained in the created tree. If there is such a node, the input section 31 leaves only a first child node and sets a node of the same operator as the node as a second child node and adds original second to Nth child nodes under the second child node. The input section 31 repeats this processing until each of AND and OR nodes has two child nodes to create a binary tree as illustrated in FIG. 1(B) and stores the binary tree in the storage section 35.

FIG. 4 illustrates an example of a data structure of a binary tree to be stored by the input section 31 in the storage section 35. This binary tree is the binary tree illustrated in FIG. 1(B). As shown in FIG. 4, each node of the binary tree has attributes including ID, type, left child node, right child node, NOT flag, and label. The IDs of nodes are numbered, for example, in a depth-first sequence starting from the root node of the binary tree. However, any other numbering scheme can be used as long as the individual nodes are uniquely identified. The type of a node indicates that the node is an AND node, an OR node, or a leaf node. The left child node and the right child node of a node indicate the IDs of the left and right child nodes of the node. If the node is a leaf node, which is not provided with child nodes, these attributes are set to NULL. The NOT flag of a node has a value of TRUE ("1", for example) or FALSE ("0", for example) indicating whether or not the node is inverted. The label of a node contains one or more characters representing a leaf node and is set to NULL for an AND node and an OR node.

Figure 5:
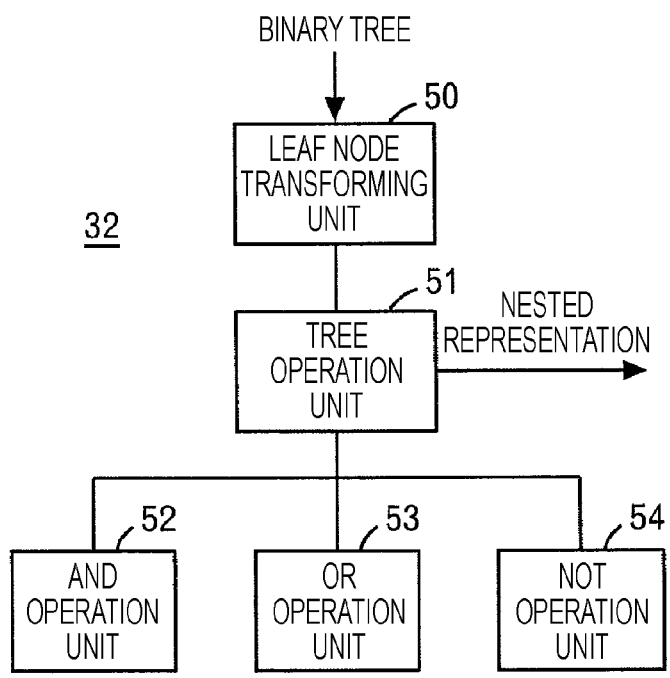
FIG. 5 is a block diagram illustrating a detailed configuration of a transforming section illustrated in FIG. 3.

The transforming section 32 serves to transform a binary tree into a two-dimensional nested representation composed of a plurality of regions, as described above. As illustrated in FIG. 5, the transforming section 32 includes a leaf node transforming unit 50 that transforms each leaf node of a binary tree created by the input section 31 into a nested object functioning as an operand of a Boolean operation according to the present invention, a tree operation unit 51 that creates a two-dimensional nested representation by performing the Boolean operation using the nested objects as operands, and an AND operation unit 52, an OR operation unit 53, and a NOT operation unit 54, each performing a logical operation for creating the nested representation.

Figure 6:
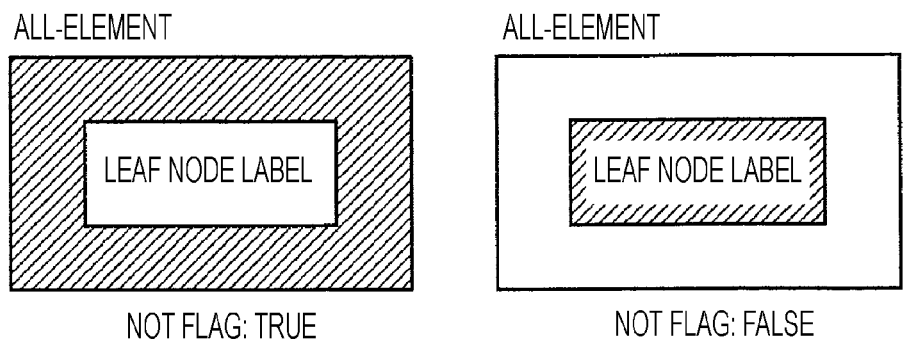
FIG. 6 is a diagram illustrating a nested object of each leaf node in a binary tree.
Figures 7, 8:
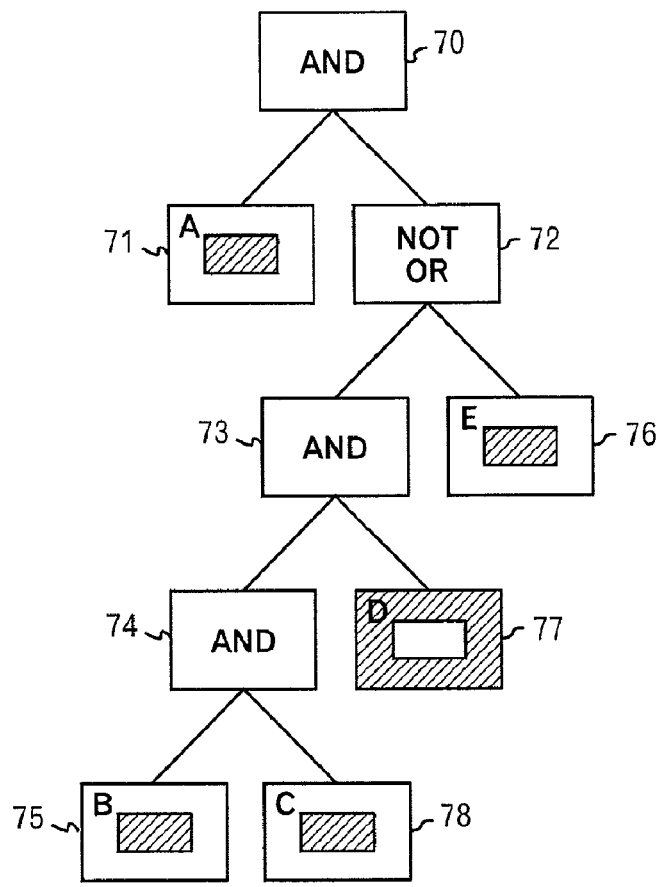
FIG. 7 is a diagram illustrating a configuration obtained after each leaf node in the binary tree illustrated in FIG. 1(B) is transformed into a nested object.
FIG. 8 is a diagram illustrating a data structure of a leaf node in a binary tree illustrated in FIG. 7.

The leaf node transforming unit 50 reads an entry whose node type is "leaf" from among the nine entries in the data structure illustrated in FIG. 4, so as to transform each leaf node of the binary tree into a nested object as illustrated in FIG. 6 in accordance with the value of the NOT flag of the leaf node. As illustrated in the figure, if the NOT flag of a leaf node is TRUE, the leaf node transforming unit 50 highlights a region enclosing the leaf node (this is an "all-element" region since that leaf node is a sole element of a set). If the NOT flag of a leaf node is FALSE, the leaf node transforming unit 50 highlights the leaf node. As a result, each of the leaf nodes of the binary tree of FIG. 1 (B), for example, is transformed as illustrated in FIG. 7. Each nested object created by the leaf node transforming unit 50 has a label of a corresponding leaf node and a flag indicative of whether or not the leaf node is highlighted. Like the NOT flag, this flag has a value of TRUE or FALSE, and a corresponding leaf node is highlighted if the flag is TRUE and not highlighted if the flag is FALSE. In the binary tree of FIG. 7, which contains four operator nodes 70, 72, 73, and 74 and five leaf nodes 71, 75, 76, 77, and 78, the nested objects corresponding to the leaf nodes 71, 75, 76, and 78 of the operands A, B, C, and E, respectively, has labels "A", "B", "C", and "E", respectively, and TRUE flags. The nested object corresponding to the leaf node 77 of the operand D has a label "D" and a FALSE flag.

FIG. 8 illustrates an example of a data structure of a nested object created by the leaf node transforming unit 50 and stored in the storage section 35. "ID" shown in FIG. 8 is the same as "ID" of FIG. 4. "Root node flag" of a leaf node indicates whether or not a region enclosing the leaf node ("all-element" region) is highlighted, and is inverted with respect to the flag of the leaf node. FIG. 6 illustrates the data structure of FIG. 8 as an image, and this image of FIG. 6 itself is not stored in the storage section 35.

The tree operation unit 51 generates a two-dimensional nested representation on the basis of the tree structure illustrated in FIG. 7 in cooperation with the AND operation unit 52, the OR operation unit 53, and the NOT operation unit 54. Next, referring to a flowchart in FIG. 9, operations of the tree operation unit 51, the AND operation unit 52, the OR operation unit 53, and the NOT operation unit 54, for generating such a nested representation will be described.

At the first STEP S1, the tree operation unit 51 checks whether or not there is a pair of leaf nodes B and C having a common parent A. This operation is carried out by searching for an entry in the data structure of FIG. 4, for example, in which an ID other than NULL is written in the fields of "left child node" and "right child node". If there is not such a pair, indicating no object to be operated, the tree operation unit 51 terminates its operation. If there is such a pair, the tree operation unit 51 proceeds to STEP S2 and checks whether or not the parent A is an AND node. If the parent A is an AND node, the tree operation unit 51 proceeds to STEP S3 and causes the AND operation unit 52 to perform an AND operation. At STEP S4, the tree operation unit 51 checks whether the NOT flag of the parent A is TRUE or FALSE. If the NOT flag is TRUE, the tree operation unit 51 proceeds to STEP S5 and causes the NOT operation unit 54 to invert the flags of all nodes in a result X of the AND operation, and then returns to STEP S1. If the NOT flag of the parent A is not TRUE, the tree operation unit 51 returns from STEP S4 to STEP S1.

At STEP S2, if the parent A is not an AND node, i.e., the parent A is an OR node, the tree operation unit 51 proceeds to STEP S6 and causes the OR operation unit 53 to perform an OR operation. Similarly to the case of the AND operation, the tree operation unit 51 returns from STEP S4 to STEP S1 or returns from STEP S4 to STEP S1 through STEP S5.

Figure 10:
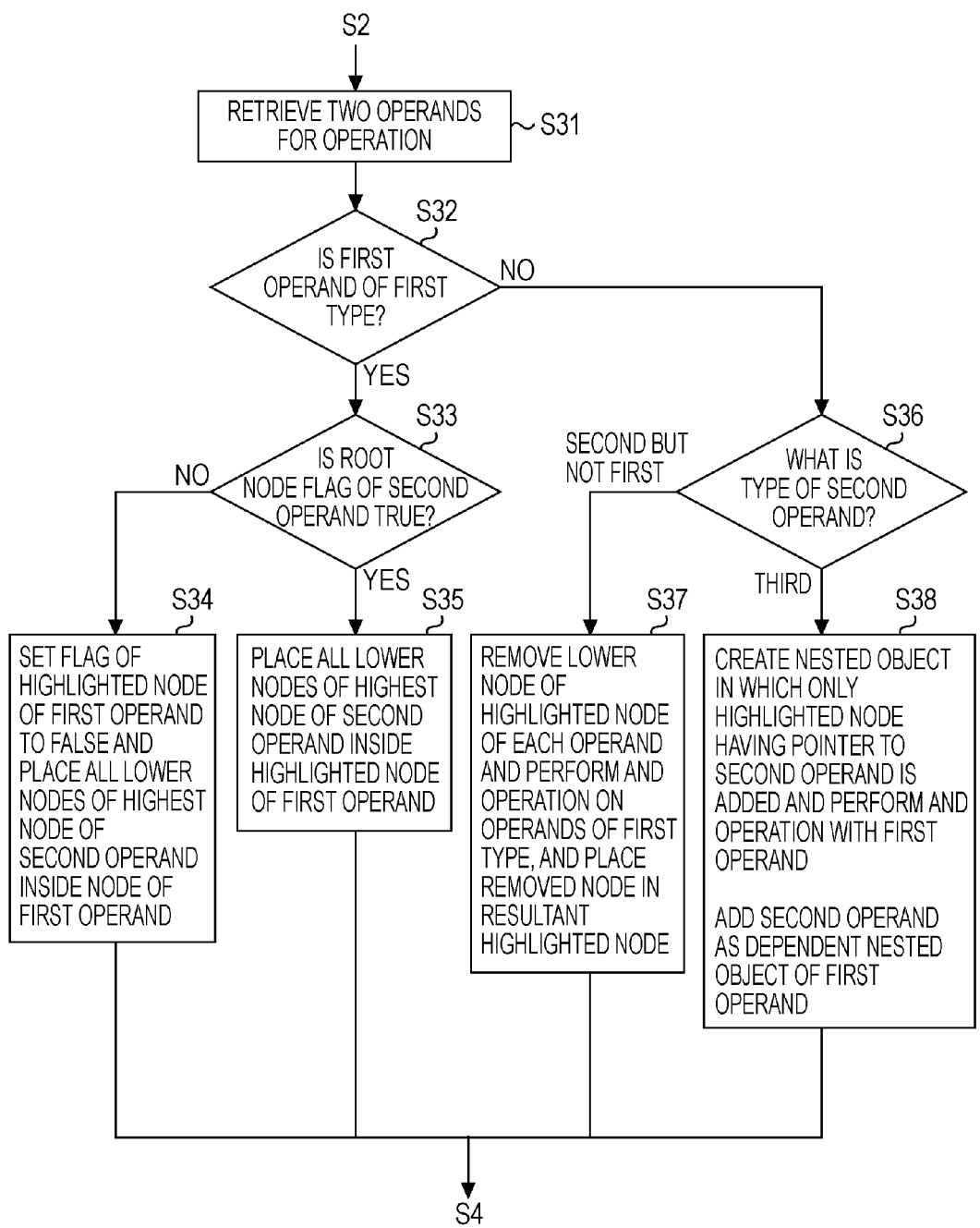
FIG. 10 is a flowchart illustrating a flow of an AND operation performed by an AND operation unit illustrated in FIG. 5.

FIG. 10 illustrates a flow of an AND operation to be performed by the AND operation unit 52. At the first STEP S31, the AND operation unit 52 retrieves two nested objects to be operated. According to the example of FIG. 4, for example, when an AND operation corresponding to the AND node whose ID is 4 is performed, its operands are the leaf nodes whose IDs are 5 and 8. Thus, the AND operation unit 52 retrieves the entries whose IDs are 5 and 8 from the data structure of FIG. 8 as the nested objects to be operated. The AND operation unit 52 performs an AND operation, i.e., combining of nested objects, which depends on which one of three types listed below each of the retrieved nested objects belongs to.

(1) First type: a nested object which has only one highlighted node and no lower node.
(2) Second type: a nested object which has only one node which is highlighted and has a higher node which is not highlighted.
(3) Third type: an operand that does not belong to any of the first type and the second type.

Examples of the above types are illustrated in FIG. 11. In FIG. 11, an example of the first type is also the second type. The third type includes all nested objects that do not belong to any of the first type and the second type. Thus, in addition to the example shown in FIG. 11, the third type also includes such a nested object in which two highlighted rectangular regions are arranged without being overlapped inside a non-highlighted rectangular region (corresponding to an OR operation of two operands, as described below).

At STEP S32, the AND operation unit 52 determines whether or not a nested object serving as a first operand is of the first type. If the nested object is of the first type, the AND operation unit 52 proceeds to STEP S33 regardless of the type of a nested object serving as a second operand and determines whether the flag of the root node of the nested object serving as the second object, i.e., the all-element node is TRUE or FALSE by, for example, accessing a corresponding entry in FIG. 8. In this example, a left leaf node of two leaf nodes under an operator node of the binary tree is set as the first operand and a right leaf node of the two leaf nodes is set as the second operand. Alternatively, the left and right leaf nodes may be set as the second and first operands, respectively.

If the flag of the all-element node which is the highest node of the second operand is FALSE, the AND operation unit 52 proceeds to STEP S34 and sets the flag of the node of the first operand whose flag is TRUE, i.e., highlighted node, to FALSE. Then, the AND operation unit 52 places all lower nodes of the all-element node of the second operand inside the node of the first operand. If the flag of the highest all-element node of the second operand is TRUE, the AND operation unit 52 proceeds to STEP S35 and places all lower nodes of the all-element node of the second operand inside the highlighted node of the first operand.

In STEP S32, if the first operand is not of the first type, the AND operation unit 52 proceeds to STEP S36 and checks the type of the second operand. If the second operands is not of the first type but of the second type, the AND operation unit 52 proceeds to STEP S37 and removes a lower node of the highlighted node contained in each operand and performs an AND operation on the operands of the first type, as described above. Then, the AND operation unit 52 place the removed lower node in the highlighted node included in the result of the AND operation.

If the second operand is of the third type, the AND operation unit 52 proceeds from STEP S36 to STEP S38 and creates a new nested object in which only a node which has a pointer to the second operand and whose flag is TRUE is added in its all-element node. Then, the AND operation unit 52 performs an AND operation on the new nested object and the first operand and adds the second operand as a dependent nested object of the first operand.

For the other cases, the first operand and the second operand are reversed, and the AND operations according to the above definition are performed. Specifically, if the types of the two operands retrieved in STEP S31 satisfies a relation "first operand type>second operand type" (e.g., the first operand type is 3 and the second operand type is 1), the AND operation unit 52 reverses the first operand and the second operand to perform the AND operations in STEP S32 and subsequent steps.

Figure 12:
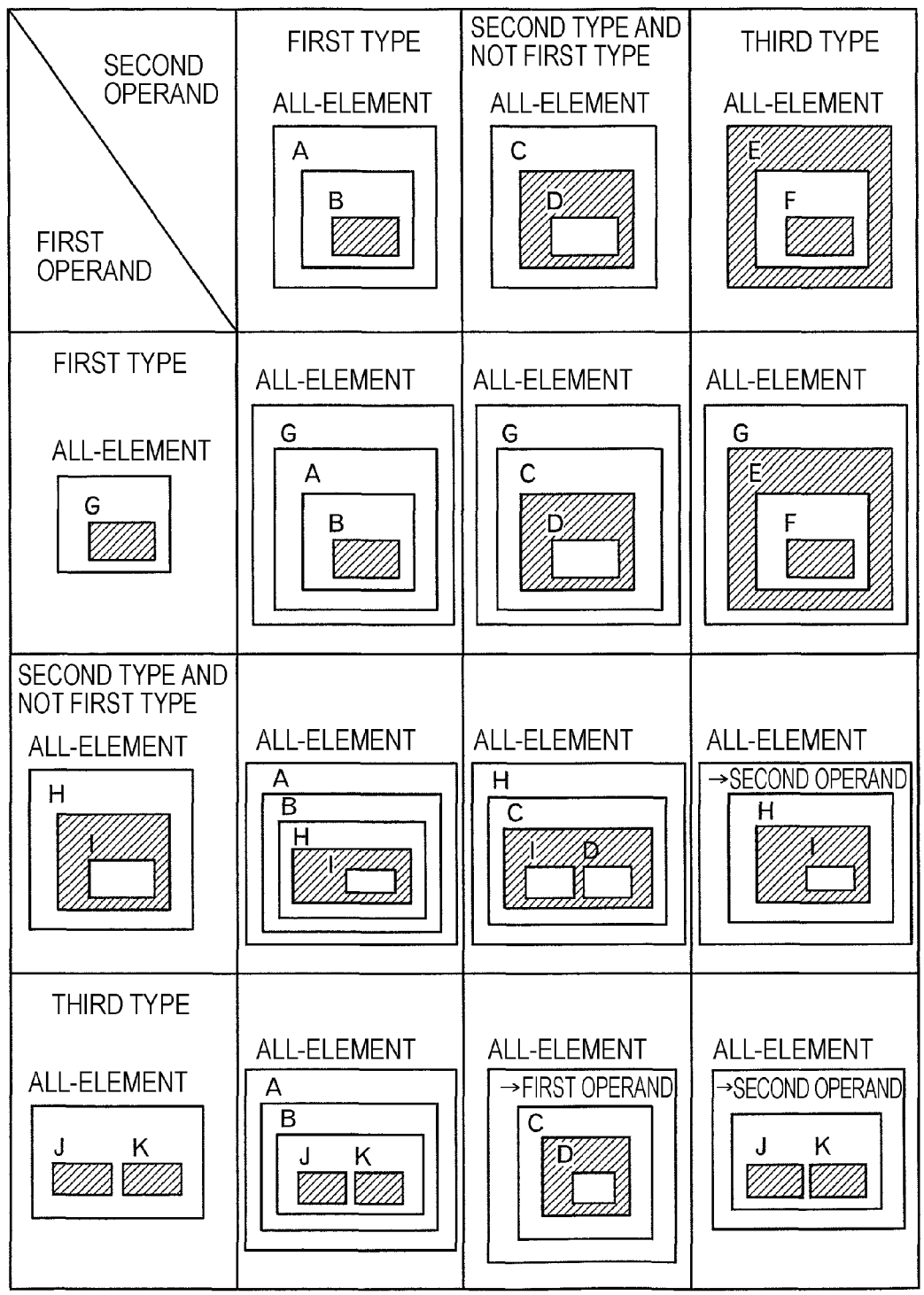
FIG. 12 is a diagram illustrating an example of an AND operation in accordance with a type of operand in the form of a table.

FIG. 12 illustrates examples of AND operation in accordance with the types described above. As apparent from FIG. 12, an AND operation according to the present invention is basically configured such that the element of one operand contains all elements of the other operand in view of visibility. For example, in an AND operation in which both operands are of the first type (operation at the intersection of the second row and the second column in FIG. 12), an element A and an element B of the second operand are contained within an element G of the first operand. If at least one operand is of the third type (AND operation of STEP S38 in FIG. 10), a node which has a pointer to the operand of the third type and whose flag is TRUE, is added to the other operand. In this case, the elements of the operand of the third type are visualized independently of the other operand, as illustrated in FIG. 13.

Figure 13:
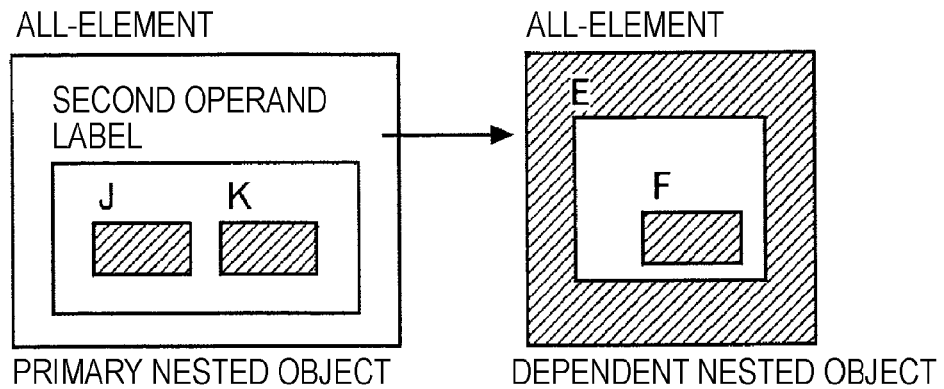
FIG. 13 is a diagram illustrating an example of a nested object composed of a primary nested object and a dependent nested object associated with the primary nested object by a pointer.

FIG. 13 illustrates a result of an AND operation indicated at the intersection of the fourth row and the fourth column in FIG. 12, in which the label of the second operand in the operation result shown in FIG. 12 and the actual elements of the second operand are associated with each other by an arrow representing a pointer. The operation result illustrated in FIG. 13 is composed of a primary nested object shown in the left side and a dependent nested object shown in the right side which is associated with the primary nested object by the pointer. This operation result may be used as an operand of another logical operation. In this case, only the primary nested object is used as the operand for the operation.

Figure 9:
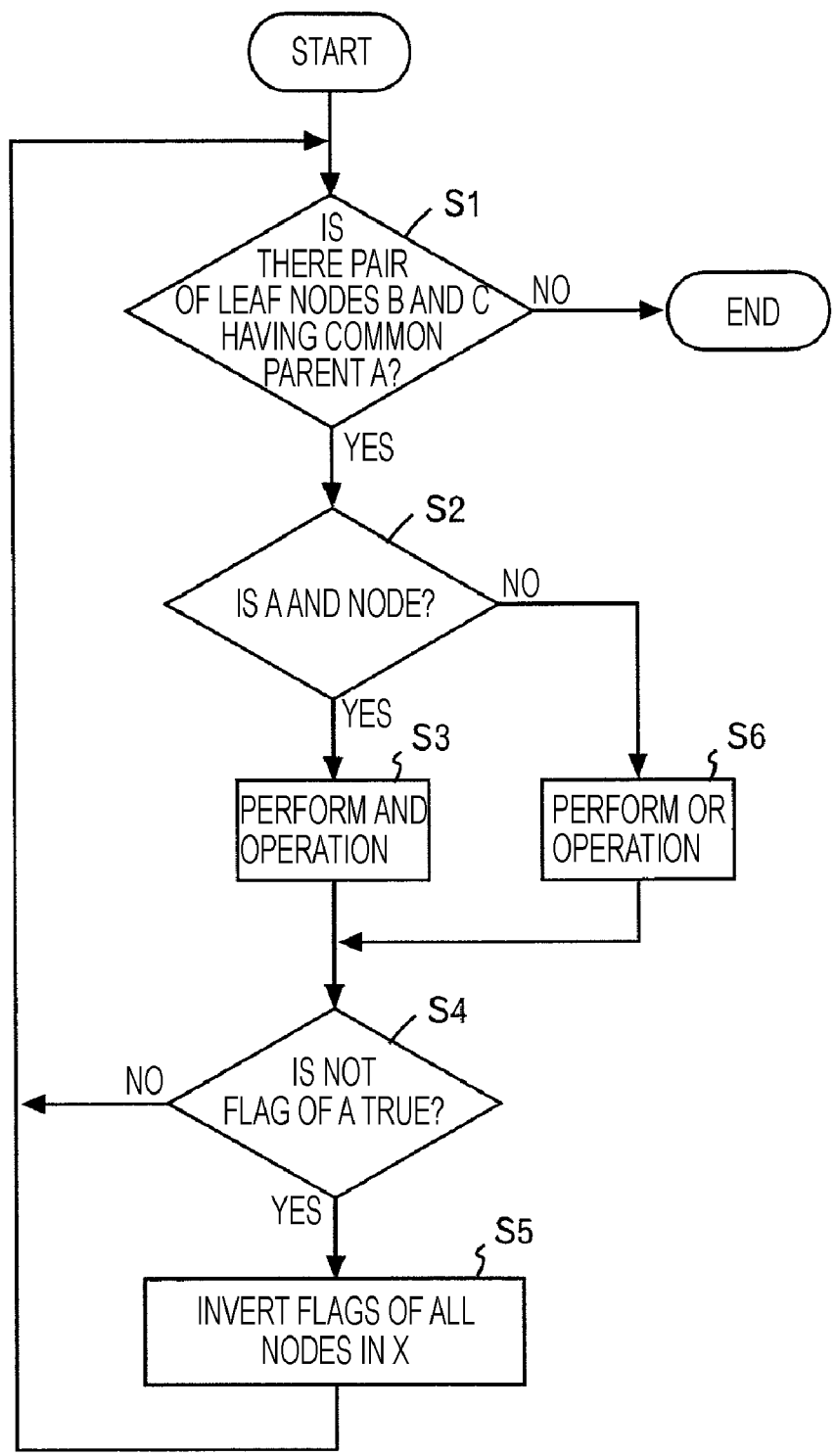
FIG. 9 is a flowchart illustrating a flow of an operation for visualizing a Boolean expression according to the present invention.
Figure 14:
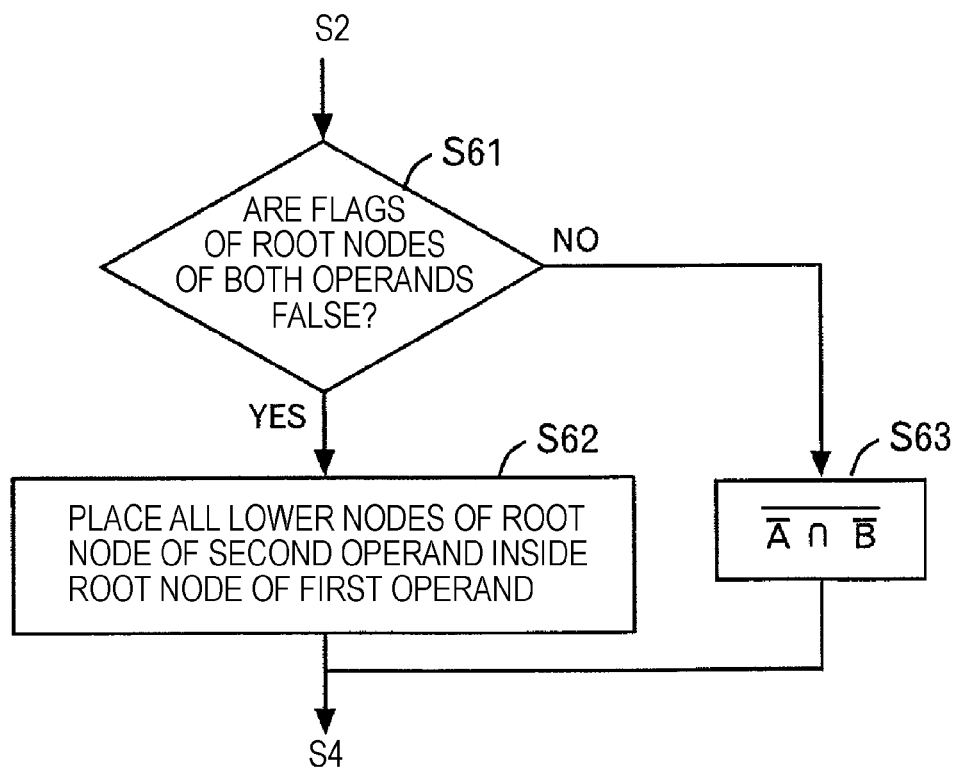
FIG. 14 is a flowchart illustrating a flow of an OR operation performed by an OR operation unit illustrated in FIG. 5.

FIG. 14 illustrates a flow of an OR operation to be performed by the OR operation unit 53 in STEP S6 in FIG. 9. At STEP S61, the OR operation unit 53 checks whether or not both the flags of root nodes of nested objects corresponding to the first operand and the second operand to be operated on are FALSE. If both the flags are FALSE, the OR operation unit 53 proceeds to STEP S62 and places all lower nodes of the root node of the nested object corresponding to the second operand into the root node of the nested object corresponding to the first operand. For example, if the AND node 74, which is the lowest AND node in FIG. 7, were an OR node, the OR operation unit 53 would output a nested object indicated as being of the third type among the three types of the first operand illustrated in FIG. 12. In other cases, i.e., at least one of the flags is TRUE, the OR operation unit 53 proceeds to STEP S63 and performs an operation NOT((NOT first operand) AND (NOT second operand)). In STEP S63 of FIG. 14, the first operand is represented as A and the second operand is represented as B. From De Morgan's theorem, it can be seen that this operation is equivalent to an OR operation between the first operand and the second operand. From the view point of the above AND operation, the operation of STEP S63 corresponds to performing an AND operation in the case where both the first operand and the second operand belong to the second type (STEP S37 in FIG. 10) and inverting all flags in the operation result. Accordingly, the operation of STEP S63 may be executed by the AND operation unit 52 and the NOT operation unit 54. In an OR operation performed by the OR operation unit 53, elements of both operands are basically arranged inside a root node, i.e., all-element node, so as not to overlap each other.

The NOT operation unit 54 outputs a nested object in which the flags of all nodes of a nested object corresponding to an operand to be operated on are inverted.

Figure 15:
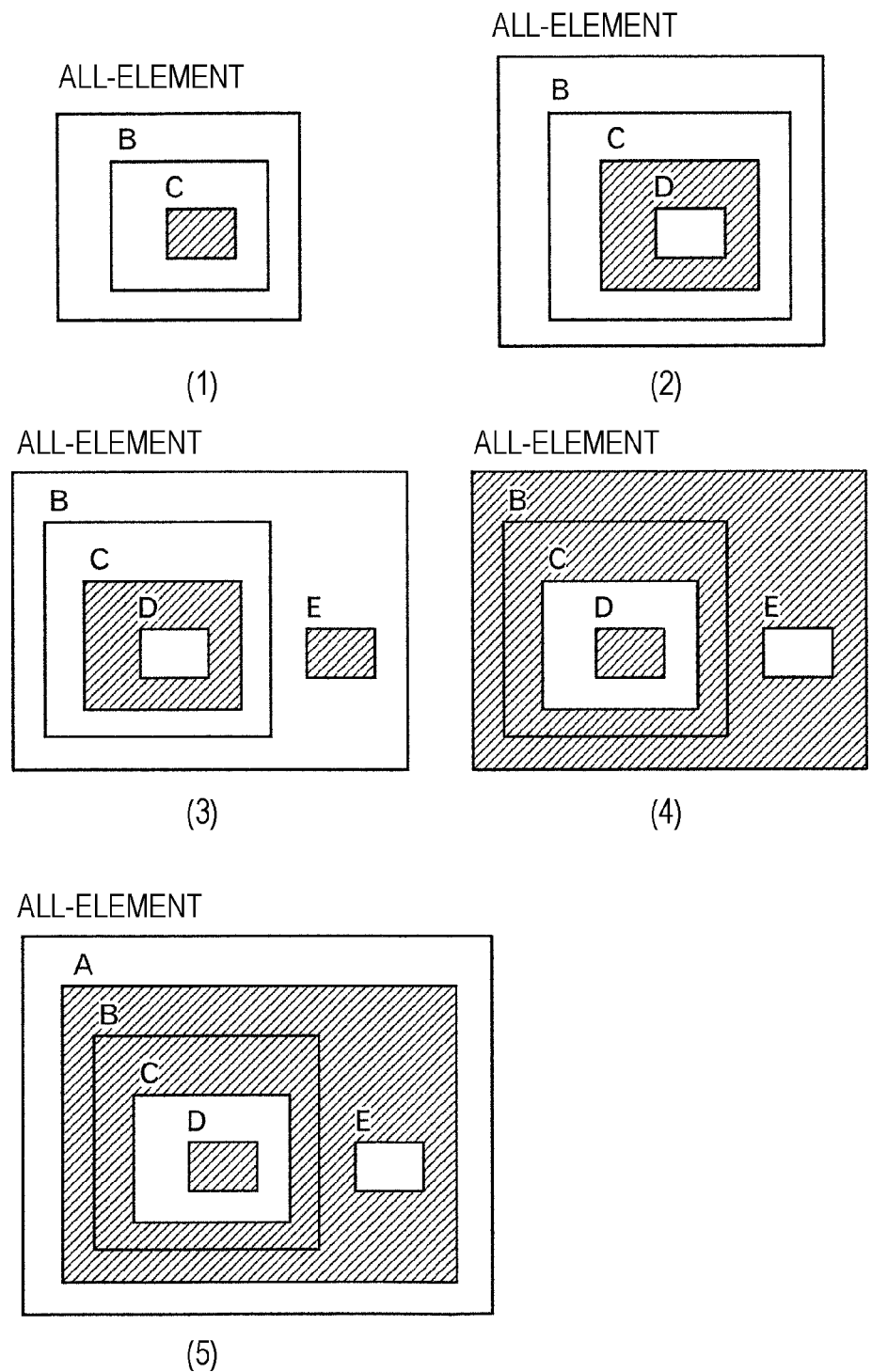
FIG. 15 is a diagram stepwisely illustrating images of nested objects obtained through individual operations performed when the binary tree shown in FIG. 7 is visualized in accordance with the present invention.

Next, the flow illustrated in FIG. 9 will be described in detail using the binary tree of FIG. 7 as an example. Among the four operator nodes 70, 72, 73, and 74, only the AND node 74 has a pair of leaf nodes thereunder. Thus, at the first STEP S1, a subtree (74, 75, 78) composed of the nodes 74, 75, and 78 is selected. At STEP S3 subsequent to STEP S2, the nested object illustrated in (1) of FIG. 15 is created as "X", and the subtree (74, 75, 78) is substituted by "X". This operation corresponds to the AND operation of STEP S34 in FIG. 10.

The tree operation unit 51 included in the transforming section 32 in FIG. 3 stores the nested object illustrated in (1) of FIG. 15 in the form of the data structure as illustrated in (1) of FIG. 16. In FIG. 16, "node" corresponds to each of a plurality of rectangular regions constituting the nested object, "label" indicates the name of each node to be specified by a user, "flag" indicates whether the node is highlighted (true) or not (false), "pointer" specifies an identifier of, if any, a dependent nested object as illustrated in FIG. 13 (null, if there is no dependent nested object), and "child node" indicates a number of a child node of the node.

Referring back to FIG. 9, since the NOT flag of the AND node 74 is FALSE in the example of FIG. 7, the operation returns from STEP S4 to STEP S, and a next subtree is selected. At this time, the subtree (74, 75, 78) has been substituted by the nested object X and set as a leaf node of the AND node 73. Thus, the subtree to be selected next in STEP S1 is composed of the nodes 73, X, and 77. Since an AND operation is performed also at this time, a nested object as illustrated in (2) of FIG. 15 is created as a new X. Since the flag of the root node (all-element node) of the second operand D corresponding to the leaf node 77 is TRUE, the AND operation of STEP S35 in FIG. 10 is performed. As a result, the data structure illustrated in (1) of FIG. 16 is modified as illustrated in (2) of FIG. 16 and stored in the storage section 35.

Next, a subtree composed of the node 72, X and 76 is similarly selected at STEP S1. Since an OR operation is performed at this time, the flow proceeds from STEP S2 to STEP S6. Both the flags of the root nodes (all-element nodes) of the nested object in (2) of FIG. 15 and the nested object 76 in FIG. 7 are FALSE (not highlighted). Thus, the result of the determination of STEP S61 in FIG. 14 is YES, and the OR operation of STEP S62 is performed. As a result, a nested object as illustrated in (3) of FIG. 15 is created as a new X, and the data structure is modified as illustrated in (3) of FIG. 16. Since the NOT flag of the OR node 72 is TRUE, the flags of all nodes in X are inverted, and a nested object as illustrated in (4) of FIG. 15 is created as a new X. Since the data structure of this new X is obtained by simply inverting all of the flags in the data structure illustrated in (3) of FIG. 16 and is thus not shown in FIG. 16.

In the last iteration loop, a subtree composed of the AND node 70, a leaf node 71, and the nested object illustrated in (4) of FIG. 15 is selected. Then, at STEP S3, an AND operation (in particular, the AND operation of STEP S35 in FIG. 10) is performed, and a nested object as illustrated in (5) of FIG. 15 is created. A data structure of the nested object is illustrated in (5) of FIG. 16. This nested object is output from the transforming section 32 as a final two-dimensional nested representation and stored in the storage section 35.

Figure 17:
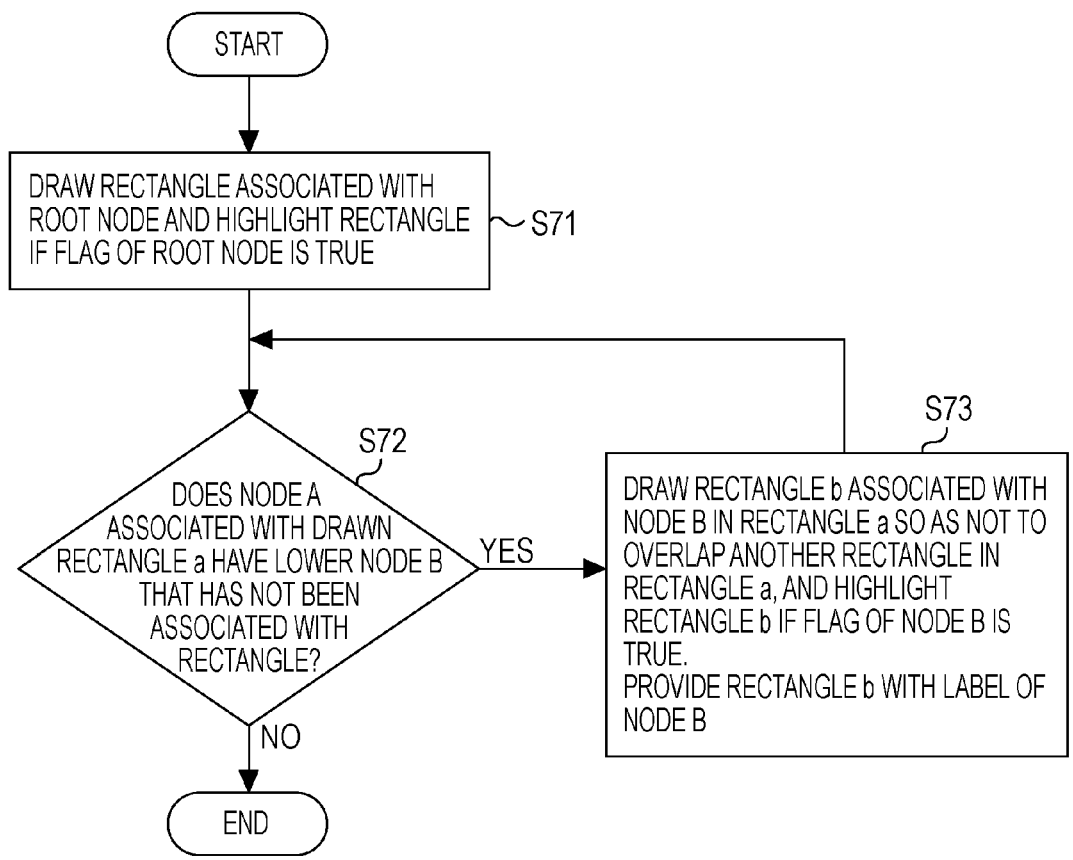
FIG. 17 is a flowchart illustrating a flow of drawing a pictorial representation performed by a drawing section illustrated in FIG. 3.

The drawing section 33 draws a pictorial representation for visualization on the basis of the nested object created by the transforming section 32 and stores the pictorial representation in the storage section 35. A flow of the operation is illustrated in FIG. 17. At the first STEP S71, the drawing section 33 draws a rectangle associated with the root node, i.e., all-element node, which is recorded in the data structure illustrated in (5) of FIG. 16. If the flag of the all-element node is TRUE, the drawing section 33 highlights the rectangular region. In the example of (5) of FIG. 16, since the flag of the all-element node is FALSE, the rectangular region is not highlighted. The rectangle may be drawn by using an HTML table or a rectangle of PowerPoint®.

Subsequently, at STEP S72, the drawing section 33 checks whether or not the node A associated with the drawn rectangle "a" has a lower node B which has not been associated with a rectangle. This can be done by referring to the column of child node in the data structure illustrated in (5) of FIG. 16. If the node A has such a lower node B, the drawing section 33 proceeds to STEP S73 and draws a rectangle "b" associated with the lower node B inside the rectangle "a", and highlights the rectangle "b" if the flag of the node B is TRUE. When the rectangle "b" is drawn, it is necessary to arrange the rectangle "b" so as not to overlap another rectangle arranged inside the rectangle "a". Lastly, the drawing section 33 provides the rectangle "b" with a label of node B and returns to STEP S71. If no lower node is found in STEP S71, the operation is terminated.

In the example shown in (5) of FIG. 16, all the fields of pointer are NULL. However, if any one of the nodes has a pointer, the drawing section 33 performs an operation similar to the above operation for a dependent nested object designated by the pointer. Then, the drawing section 33 connects the node having the pointer and the dependent nested object by an arrow.

The display section 34 reads the pictorial representation drawn by the drawing section 33 from the storage section 35 and visibly displays the read pictorial representation on a screen.

Figure 18:
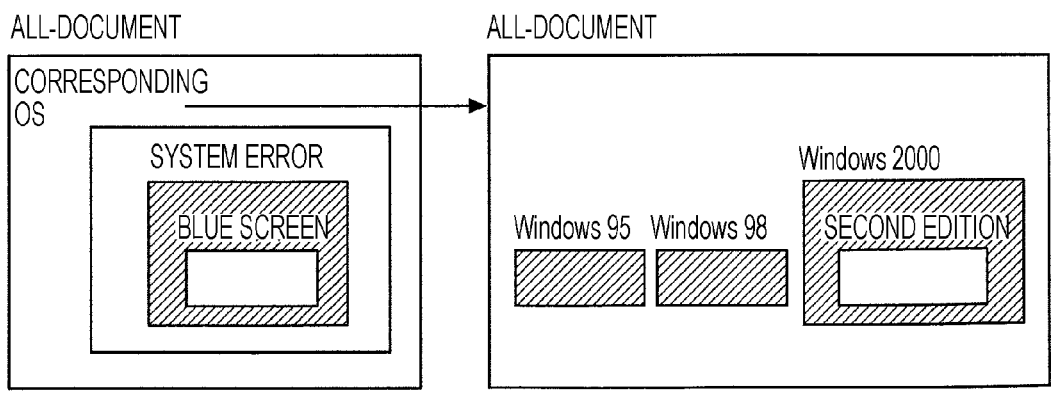
FIG. 18 is a diagram illustrating an example of a case where an actual search expression is visualized in accordance with the present invention.

In an actual search, for example, when it is desired to search about system errors other than Blue Screen of Death in Windows® 95, Windows® 98, or Windows® 2000 (excluding Second Edition), a Boolean expression for the search is ((Windows® 95 OR Windows® 98 OR (Windows® 2000 AND (!Second Edition))) AND (system error AND (!Blue Screen))). When the present invention is applied to this Boolean expression, for example, a visual display as illustrated in FIG. 18 can be obtained. With this display, a user can instantly recognize conditions under which the search is conducted. Thus, by incorporating the present invention into a conventional search tool, a user-friendly search tool can be provided to users.

The present invention can be implemented in hardware or a combination of hardware and software. A typical example of implementation with the combination of hardware and software is a computer system with a predetermined program. In this case, the predetermined program, when loaded into the computer system and executed, controls the computer system to perform processing according to the present invention. This program is constituted by a set of instructions that can be represented in any language, code or notation. The set of instructions allows the computer system to perform specific functions directly or after (1) conversion into another language, code, or notation, and/or (2) reproduction on a different material. In addition to the program itself, a medium recording the program is also included within the scope of the present invention. The program for implementing the functions of the present invention can be stored on any computer-readable medium, such as a flexible disk, MO, CD-ROM, DVD, hard disk drive, ROM, MRAM, or RAM. The program can also be stored on a recording medium by downloading it from another computer system connected through a communication line, or reproducing it from another recording medium. Further, the program can be stored on one or more recording media by compressing it or dividing it into two or more program components.

Figure 19:
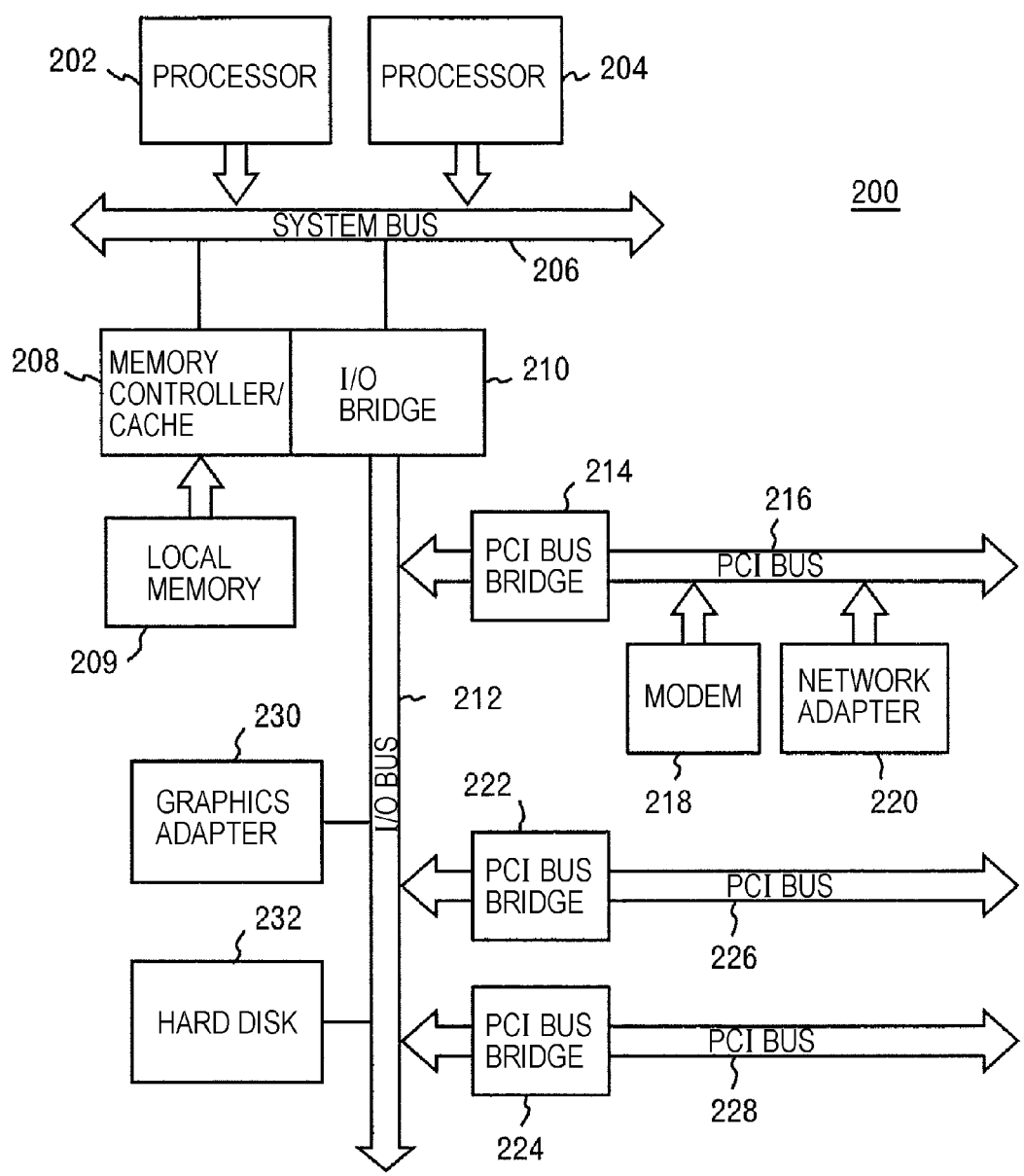
FIG. 19 is a block diagram illustrating an example of a hardware configuration of a computer system which can implement the present invention.

FIG. 19 illustrates an example of a hardware configuration of the computer system mentioned above. A computer system 200 is a symmetric multiprocessor (SMP) system including a plurality of processors 202 and 204 connected to a system bus 206. Alternatively, the computer system 200 may be a single processor system. Also connected to the system bus 206 is a memory controller/cache 208 which provides an interface to a local memory 209. An I/O bus bridge 210 is connected to the system bus 206 and provides an interface to an I/O bus 212. The memory controller/cache 208 and the I/O bus bridge 210 may be integrated as depicted.

A PCI bus bridge 214 connected to the I/O bus 212 provides an interface to a PCI local bus 216. A number of modems may be connected to the PCI local bus 216. Typical PCI bus implementations will support four PCI expansion slots or add-in connectors. Communication links to a network (not shown) are provided through a modem 218 and a network adapter 220 connected to the PCI local bus 216 via add-in boards.

Additional PCI bus bridges 222 and 224 provide interfaces for additional PCI local buses 226 and 228. This allows the use of additional modems and network adapters. A memory-mapped graphics adapter 230 and a hard disk drive 232 are also connected to the I/O local bus 212 either directly or indirectly, as illustrated. The display section 34 in FIG. 3 is connected to the graphics adapter 230, which is not shown in FIG. 19.

The hardware configuration illustrated in FIG. 19 is only an example, and another hardware configuration may be employed. For example, other peripheral devices such as an optical disk drive and the like may also be used in addition to or in place of the hardware illustrated. The illustrated example is not intended to imply architectural limitations with respect to the present invention.

While the preferred embodiment of the present invention has been described in detail, it should be understood that the present invention is not limited to the above described embodiment, and various modifications and alterations may be made within the scope of the present invention as defined by the appended claims.

What is claimed is:

1. A computer apparatus for generating and displaying a pictorial representation of a Boolean expression, the apparatus comprising:
   a processor;
   at least one processing device for executing stored program components;
   an input component for inputting the Boolean expression to be pictorially represented into a form of a binary tree in which a leaf node represents an operand in the Boolean expression and a node other than the leaf node represents an operator in the Boolean expression;
   a transforming component for transforming the binary tree into a two-dimensional nested representation composed of a plurality of regions; and
   a drawing component for drawing a pictorial representation for visualization on the basis of the nested representation;
   a storage memory for storing the binary tree input by the input component, the nested representation created by the transforming component, and the pictorial representation drawn by the drawing component; and
   a display for visually displaying the pictorial representation,
   wherein the nested representation is composed of at least one nested object containing a plurality of nodes and wherein the transforming component transforms a leaf node of the binary tree into a nested object having a label of the leaf node and a flag, and highlights an operand corresponding to the leaf node when the flag is set to a first value and highlights a region enclosing the operand when the flag is set to a second value.

2. The apparatus of claim 1, wherein the transforming component includes:
   a leaf node transforming unit transforming each leaf node in the binary tree input by the input section into a nested object functioning as an operand of a Boolean operation;
   a tree operation unit creating a two-dimensional nested representation by performing the Boolean operation using the nested object as the operand; and
   an AND operation unit, an OR operation unit, and a NOT operation unit performing logical operations for creating the nested representation.

3. The apparatus of claim 1, wherein when the Boolean expression is provided in a string expression, the input component transforms the sting expression into a binary tree.

4. The apparatus of claim 3, wherein the input component transforms the string expression into a normal tree and then transforms the normal tree into a binary tree.

5. The apparatus of claim 3, wherein a leaf node of the binary tree has a label representing an operand and a NOT flag, and a node other than the leaf node has an attribute of AND or OR and a NOT flag.

6. The apparatus of claim 1, wherein the transforming component creates at least one nested object containing a plurality of nodes by performing an operation on the nested object of the leaf node in accordance with an operator specified in a higher node of the binary tree and the flag of the nested object.

7. The apparatus of claim 6, wherein each of the plurality of nodes has (1) a label indicative of an operand or all elements and a flag indicative of whether or not the node is highlighted or (2) a pointer to another nested object, a user-defined label, and a flag indicative of whether or not the node is highlighted.

8. The apparatus of claim 7, wherein when the operation is a NOT operation, the flags of all nodes contained in a nested object to be operated on are inverted.

9. The apparatus of claim 7, wherein when the operation is an AND operation, it is determined which one of types each of a first and second nested objects to be operated on belongs to, the types including a first type in which a nested object has only one highlighted node and no lower node, a second type in which a nested object has only one node which is highlighted and whose higher node is not highlighted, and a third type in which a nested object does not belong to either the first or second type, and addition of node and inversion of flag are selectively performed in accordance with the types of the first and the second nested objects.

10. The apparatus of claim 9, wherein:
   (1) in a case where the first nested object is of the first type, if a flag of an all-element node which is the highest node of the second nested object is false, a flag of a node of the first nested object whose flag is true is set to false, and all lower nodes of the all-element node of the second nested object are placed inside the node of the first object; and if the flag of the highest all-element node of the second nested object is true, all the lower nodes of the all-element node of the second nested object are placed inside the node of the first nested object whose flag is true,
   (2) in a case where neither the first nor second nested object is of the first type and the second nested object is of the second type, a lower node of a node which is contained in each of the nested objects and whose flag is true is removed, an AND operation between the nested objects of the first type is performed, and the removed lower nodes are placed inside a node contained in a result of the AND operation whose flag is true,
   (3) in a case where the first nested object is not of the first type and the second nested object is of the third type, a new nested object, which is provided with a pointer to the second nested object in an all-element node and to which a node whose flag is true is added, is created, an AND operation between the new nested object and the first nested object is performed, and the second nested object is added as a dependent nested object of the first nested object,
   (4) in a case other than (1) to (3), the first nested object and the second nested object are reversed and the operations of (1) to (3) are performed.

11. The apparatus of claim 10, wherein in a case where the operation is an OR operation, if both flags of root nodes of the first and the second nested objects to be operated on are false, all lower nodes of the root node of the second nested object is placed inside the root node of the first nested object, and if at least one of the flags of the root nodes of the first and the second nested objects is true, an AND operation is performed after all flags of the first nested object and the second nested object are inverted, and all flags of a result of the AND operation are inverted.

12. The apparatus of claim 7, wherein the drawing component
   (1) draws a rectangle associated with an all-element node and highlights the all-element node if a flag of the all-element node is true, and
   (2) if a node associated with a drawn rectangle has a lower node which has not been associated with a rectangle, draws a rectangle associated with the lower node in the interior of the drawn rectangle so as not to overlap another rectangle placed inside the drawn rectangle.

13. A computer-implemented method for generating a pictorial representation of a Boolean expression, the method comprising the steps of:
   inputting the Boolean expression to be pictorially represented in a form of a binary tree in which a leaf node represents an operand in the Boolean expression and a node other than the leaf node represents an operator in the Boolean expression and storing the binary tree;
   transforming, by using a computer system, the binary tree into a two-dimensional nested representation composed of a plurality of regions and storing the two-dimensional nested representation;
   drawing a pictorial representation for visualization on the basis of the nested representation and storing the pictorial representation; and
   displaying the pictorial representation,
   wherein the nested representation is composed of at least one nested object containing a plurality of nodes and wherein the transforming step transforms a leaf node of the binary tree into a nested object having a label of the leaf node and a flag, and highlights an operand corresponding to the leaf node when the flag is set to a first value and highlights a region enclosing the operand when the flag is set to a second value.

14. A program storage memory storing a program for generating a pictorial representation of a Boolean expression, the program causing a computer to function as:
   an input section for inputting the Boolean expression to be pictorially represented in a form of a binary tree in which a leaf node represents an operand in the Boolean expression and a node other than the leaf node represents an operator in the Boolean expression;

a transforming section for transforming the binary tree into a two-dimensional nested representation composed of a plurality of regions;

a drawing section for drawing a pictorial representation for visualization on the basis of the nested representation;

a storage section for storing the binary tree by the input section, the nested representation created by the transforming section, and the pictorial representation drawn by the drawing section; and a display section for displaying the pictorial representation, wherein the nested representation is composed of at least one nested object containing a plurality of nodes and wherein the transforming section transforms a leaf node of the binary tree into a nested object having a label of the leaf node and a flag, and highlights an operand corresponding to the leaf node when the flag is set to a first value and highlights a region enclosing the operand when the flag is set to a second value.

* * * * *